Figure 1:
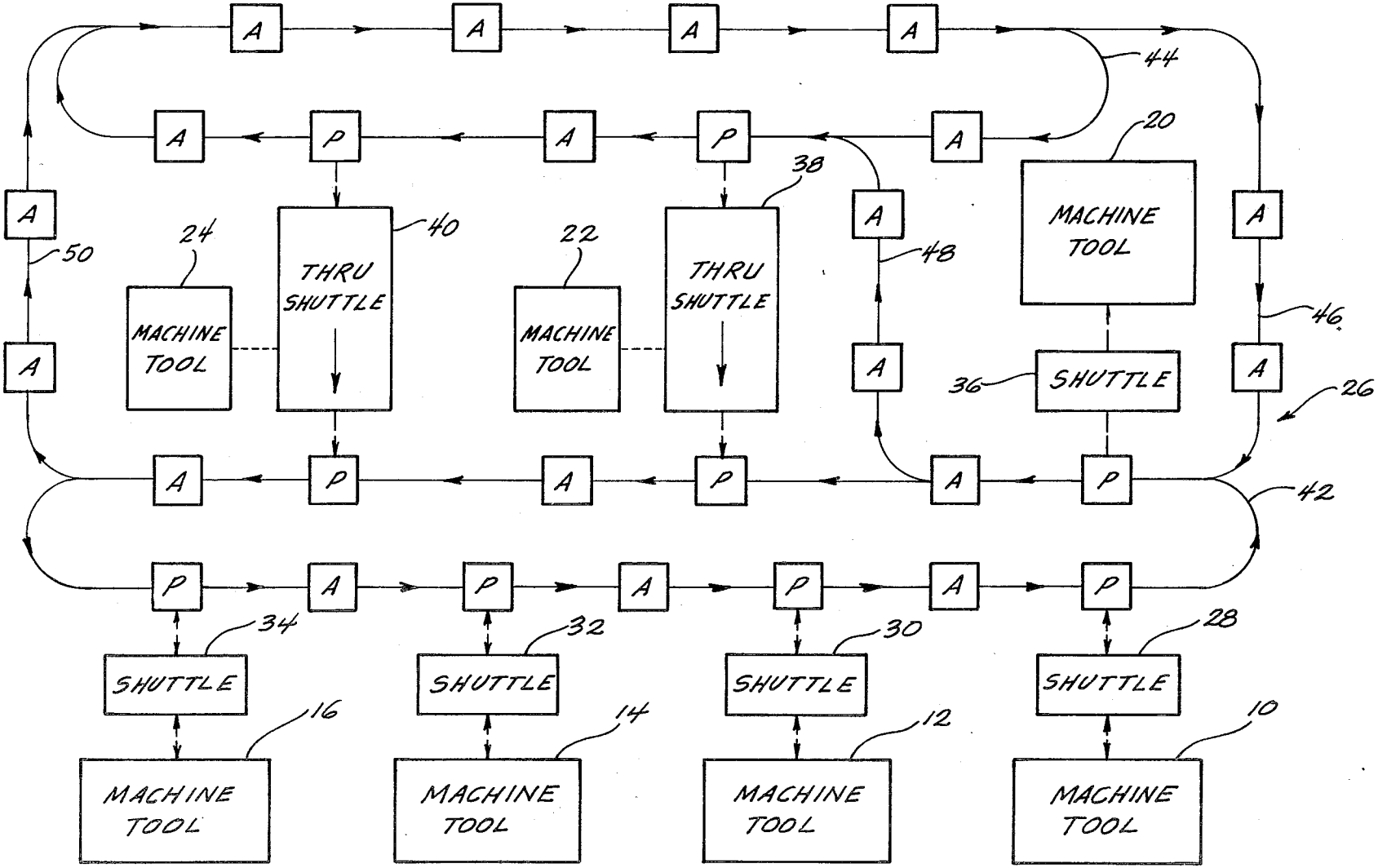
Figure 2:
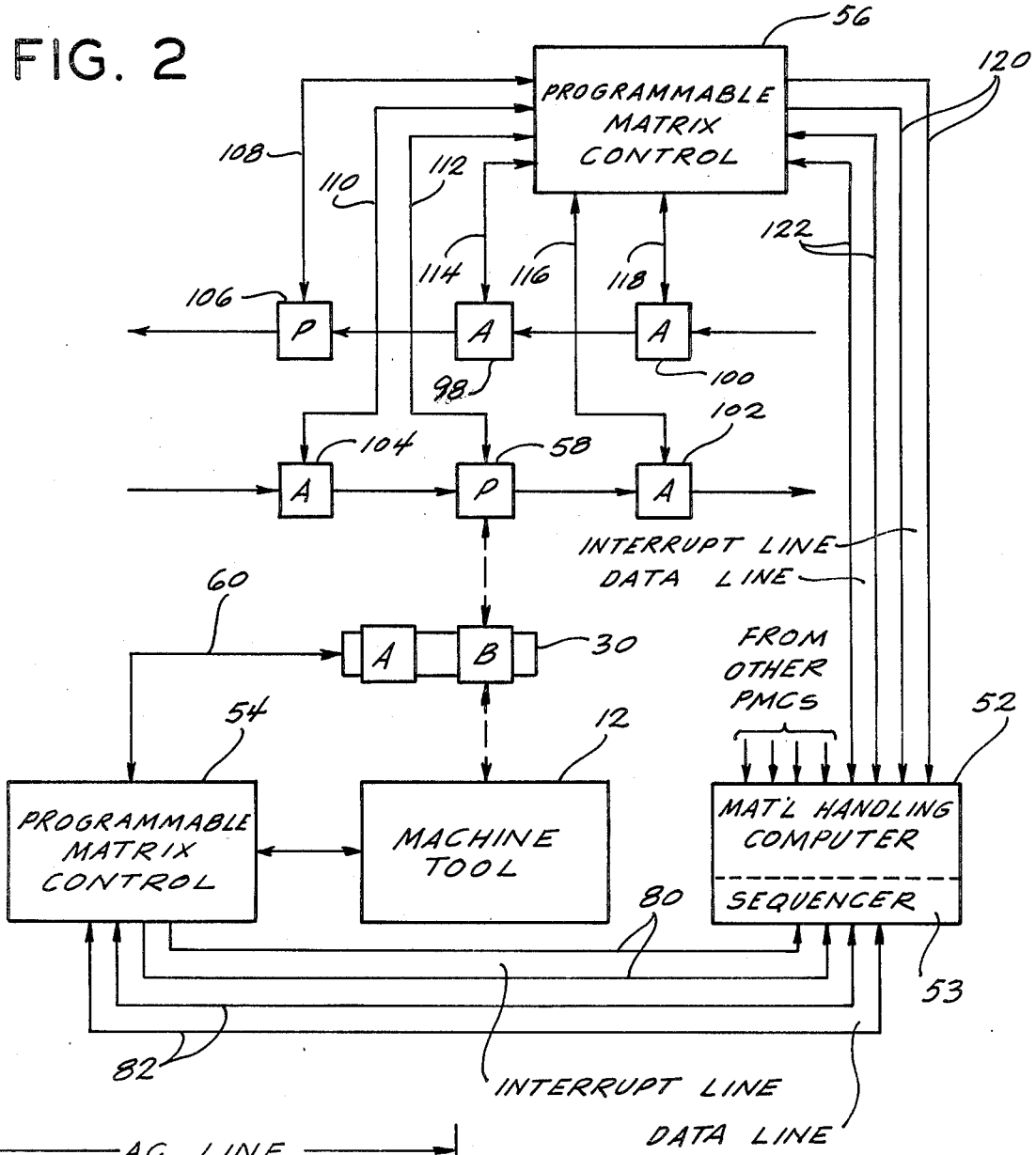
Figure 3:
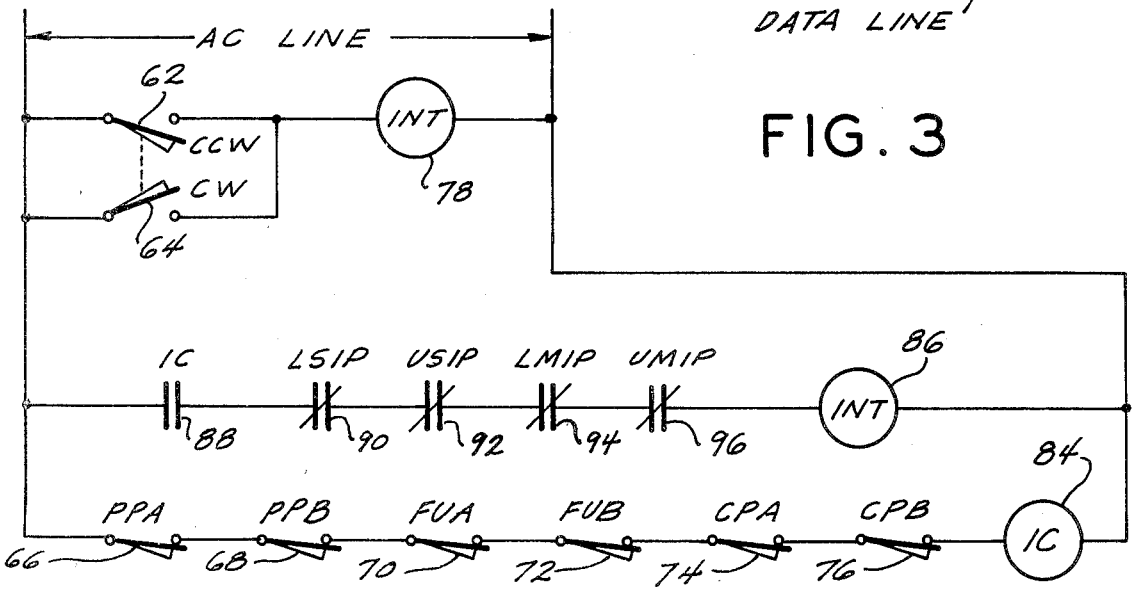

United States Defensive Publication [19] (H) [11] T995,005

Merkel et al. [43] Jun. 3, 1980

[54] DIGITAL DATA COMMUNICATION LINK FOR AUTOMATIC MACHINING SYSTEM

[75] Inventors: Kenneth J. Merkel, Brookfield; Louis T. Svitkovich, Milwaukee, both of Wis.

[73] Assignee: Kearney & Trecker Corporation, West Allis, Wis.

[21] Appl. No.: 967,967

[22] Filed: Dec. 11, 1978

[51] Int. Cl.[2] ..... H04Q 5/00

[52] U.S. Cl. ..... 340/147 P; 340/518; 340/163

[57] ABSTRACT

A plurality of machine tools are linked together by a material handling system which carries workpieces from one machine tool to the next in line along a conveyor. The workpieces are clamped to pallets which are carried on conveyor carts between machine tools and which are shuttled onto the machine tools under the guidance of a material handling computer which controls all of the conveyor carts and pallets in the system. The limit switches which indicate the position of the carts and pallets are wired to the material handling computer over a novel data communication link which uses only two pairs of conductors for each machine tool and each section of the material handling system. A large number of limit switches can be handled by two pairs of conductors by generating an interrupt signal whenever a change occurs in the position of a cart or pallet and coupling the interrupt signal to the material handling computer over one pair of conductors while the other pair of conductors is used to sequentially interrogate all of the pertinent limit switches following receipt of the interrupt signal.

2 Claims, 2 Sheets Drawing,

8 Pages Specification

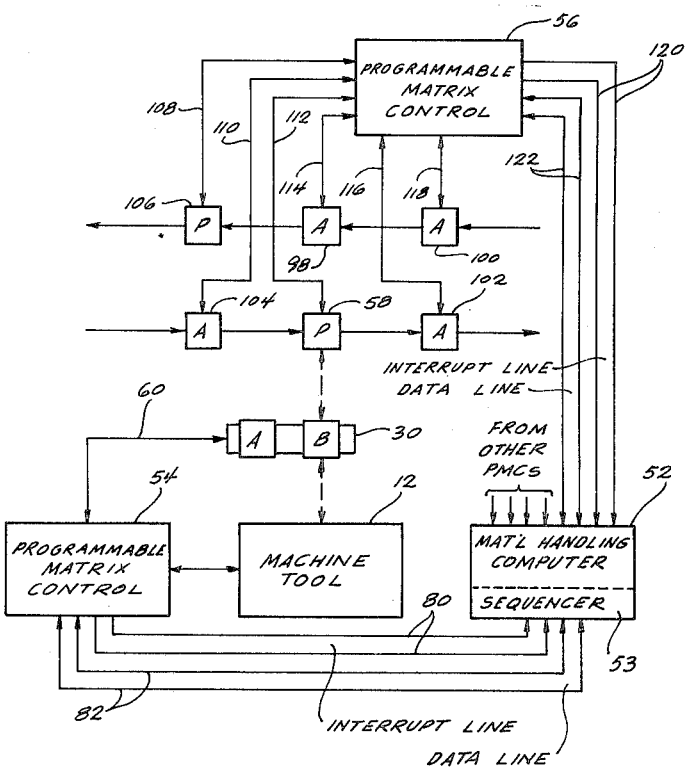

The file of this unexamined application may be inspected and copies thereof may be purchased (849 O.G. 1221, Apr. 9, 1968).